United States Patent [19]

Duguet

[11] Patent Number: 4,990,316
[45] Date of Patent: Feb. 5, 1991

[54] APPARATUS FOR THE DISOLUTION OF OZONE IN A FLUID

[75] Inventor: Jean-Pierre Duguet, Le Pecq, France
[73] Assignee: Lyonnaise des Eaux, Paris, France
[21] Appl. No.: 454,242
[22] Filed: Dec. 21, 1989

[30] Foreign Application Priority Data

Dec. 23, 1988 [FR] France .................. 88-17134

[51] Int. Cl.$^5$ ............. C02F 1/78; C02F 1/50
[52] U.S. Cl. ................. 422/186.07; 210/760
[58] Field of Search ........ 210/759, 760, 199; 422/186, 186.07, 186.18, 186.19; 204/175, 176

[56] References Cited

U.S. PATENT DOCUMENTS 4,332,687 6/1982 Daignault et al. ........... 210/721
4,572,821 2/1986 Brodard et al. ............ 210/760

FOREIGN PATENT DOCUMENTS 2545732 11/1984 France .
2563208 10/1985 France .

Primary Examiner—Charles T. Jordan
Assistant Examiner—J. Woodrow Eldred
Attorney, Agent, or Firm—Pollock, VandeSande & Priddy

[57] ABSTRACT

An apparatus for the dissolution of ozone in a fluid such as water, for its treatment by the ozone, by injection in said fluid of ozonic air or ozonic gas, including at least one tube placed vertically in a vertical tubular enclosure and communicating with this enclosure via its lower end and via its upper end with means for supplying the fluid to be treated and the ozonic air or ozonic gas. Said vertical tubular enclosure is closed at both its ends and provided with means for the discharge of the fluid treated and of the ozonic air or gas in excess, characterized in that it is provided with means for the injection of hydrogen peroxide so as to complete the oxidation reaction through a radical route.

3 Claims, 1 Drawing Sheet

APPARATUS FOR THE DISOLUTION OF OZONE IN A FLUID

FIELD AND BACKGROUND OF THE INVENTION

U.S. Pat. No. 4,572,821 filed on May 7, 1984 under French priority (patent No. 83.07764 of May 10, 1983) relates to an apparatus for the dissolution of ozone in a fluid, by injection in said fluid of ozonic air or a gas such as ozonic oxygen, usable in particular for the ozone treatment of water, notably of water for human consumption.

This apparatus, including at least one tube placed vertically in a vertical tubular enclosure and communicating with said enclosure by its lower end, and by its upper end with means for supplying the fluid to be treated and the ozonic air, or ozonic gas, is characterized notably in that the vertical tubular enclosure is of a very extended length - possibly reaching from 10 to 100 meters - when compared to its diameter which is advantageously between 0.5 and 5 meters.

OBJECTS AND SUMMARY OF THE INVENTION

The present invention aims particularly to the use of such an apparatus for the dissolution in a fluid, notably water to be treated, not only of ozone, but of any compound adapted for freeing hydroxyl radicals, particularly of hydrogen peroxide.

The progress made in the knowledge of ozone chemistry has allowed setting in evidence two main ozone oxidation routes: the direct reaction by molecular ozone $O_3$ and the reaction by the so-called "radicular" route, in particular the oxidation reactions by the hydroxyl (OH) radical.

Molecular ozone exhibits a high oxidation potential but the reactions are very selective and generally slow. In the case of the hydroxyl radical, the oxidation potential is higher than that of ozone and the reactions are quick but not very selective. Therefore, the radical oxidation can lead to the complete mineralization of the organic matters which one wishes to remove from the fluid to be treated.

These radicals can be generated by various systems such as the basic pH ozonization, the combinations $O_3/UV$, $O_3/H_2O_2/UV$.

After a laboratory study of such systems, the oxidation by $O_3/H_2O_2$ has been tested with success for the clarification of water, and has been considered as good.

Usually, the radical oxidation is made by using a standard ozonization vat, the hydrogen peroxide being mixed with the water to be treated prior to passing through the vat.

This mode of operation however does not allow optimizing the hydrogen peroxide action while reducing its consumption.

To this effect, it is convenient:

during a first stage to provide oxidation by ozone alone in order to remove the easily ozone oxidizable matters and by carrying the radical oxidation during a second stage for removing the matters having resisted the ozone action, to take into account that, since side reactions are produced during radical oxidation between the free radicals and the hydrogen peroxide, there exists an optimal concentration of hydrogen peroxide allowing an optimal oxidation of the organic matters while using the minimum quantity of hydrogen peroxide which maintains an optimal hydrogen peroxide concentration in the apparatus where the oxidation is taking place. Therefore, it is necessary to introduce in the apparatus hydrogen peroxide with an optimum distribution in space and therefore in time, finally, to realize that if the radical oxidation reactions are very quick, the transfer speed of ozone in water is by no means so quick.

The apparatus claimed in the hereabove mentioned U.S. Pat. No. 4,572,821 allows these various conditions and requirements to be satisfied.

Indeed, the design of this apparatus allows obtaining from an 85 to a 100% yield in ozone dissolution for an extremely short period of contact of the order of 1 minute. This means that such an apparatus allows reducing to the minimum the time of transfer of ozone and therefore improves the oxidation of undesirable organic matters.

Moreover, it is particularly adapted to a stepped and harmoniously distributed injection of hydrogen peroxide in the liquid flux already treated by the ozone.

Such an injection can be made by using any convenient means. Hereafter is described by way of a non limiting example an injection device with reference to FIGS. 1 and 2 of the accompanying drawing.

DETAILED DESCRIPTION OF THE INVENTION

Figure 1:
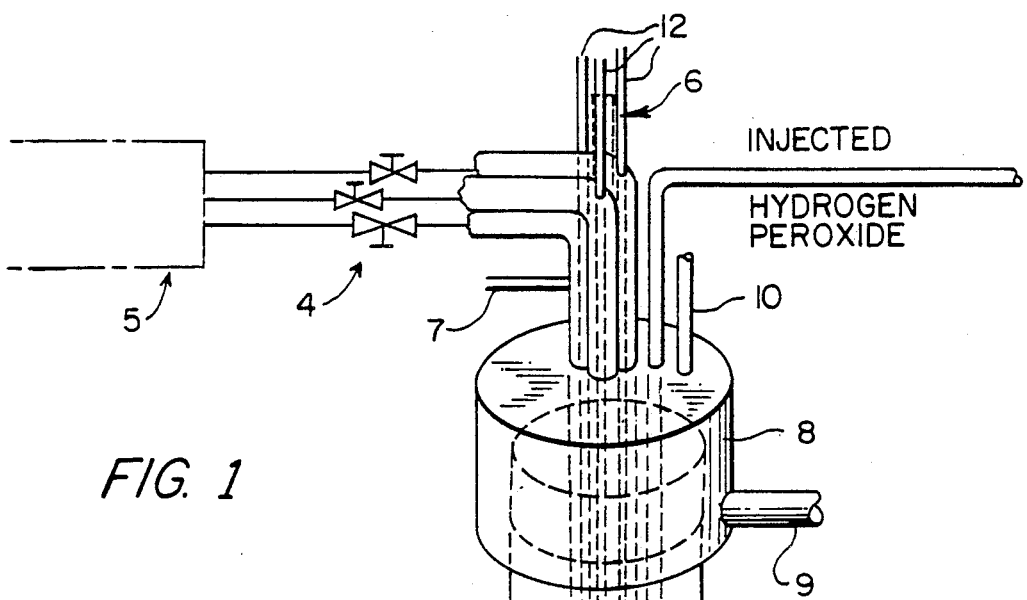
FIG. 1 is a cut-away perspective view of a tube containing chamber having hydrogen peroxide injection means.

FIG. 1 of the present application has identical numbering of parts as FIG. 1 of prior-mentioned U.S. Pat. No. 4,572,821, those identical parts being incorporated by reference herein.

The apparatus is made of a closed vertical tubular enclosure 1 ih which is lowered a bundle of vertical tubes 2 communicating via their lower ends 3 with the enclosure and by check valves 4 with pipe 5 bringing the water to be treated.

The ozonic air or gas is introduced in the upper portion of each tube via pipes 6.

In the vicinity of the lower or upper end of the tubular bundle is provided a pipe 7 for the introduction of an extra fluid such as for example a catalyst.

Blades 11 attach the bundle of tubes to the wall of enclosure 1 and provide moreover for a rotary motion of the fluid which moves upwardly inside the enclosure from its exit from the tube bundle, thereby lengthening the period of contact between the ozonic air or gas and the fluid to be treated.

Figure 2:
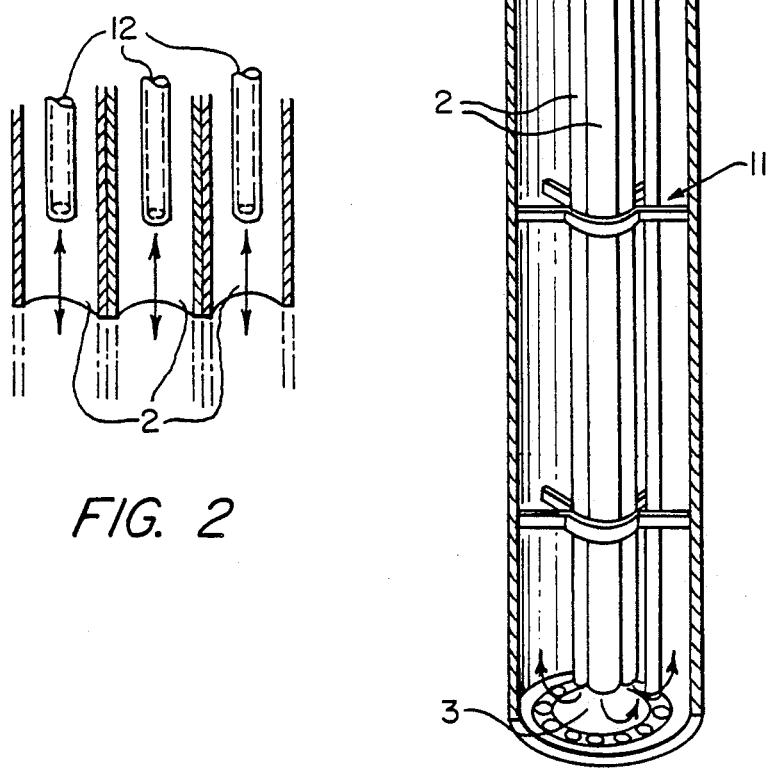
FIG. 2 is a partial sectional view of hydrogen peroxide supply pipes employed in the present invention.

According to the invention, the hydrogen peroxide is supplied to the apparatus by tubes or pipes 12, of the same length. They are lowered as may be seen particularly in FIG. 2, inside the vertical tubes 2 conveying the water to be treated and the ozone for treating the water.

The pipes can also be of different lengths, thereby allowing introduction of the hydrogen peroxide at the chosen levels for obtaining the required stepping of its injection into the ozonic water flow.

In the example described and shown, the injection of hydrogen peroxide is taking place in the descending flow. It can also be made in its ascending flow, that is in the annular space included between tubes 2 and enclosure 1.

One may then use an injection system made of one or several axially offset crowns said crowns being formed with orifices and surrounding enclosure 1. These crowns are fed with hydrogen peroxide by a standard pump. The diameter of their orifices is designed so as to optimize the quantities of hydrogen peroxide injected, for example at each offset stage.

However, it goes without saying that the injection of hydrogen peroxide can be made simultaneously with the descending flow and ascending flow of the apparatus, at the same level, or at different levels.

The invention is of course by no way limited to the embodiment shown and described and may be the object of many modifications without departing from its scope.

I claim:

1. In an apparatus for the dissolution of ozone in a liquid undergoing treatment by the introduced ozone, the apparatus having a tubular chamber, submerged inlet pipes for introducing, in a first direction, ozonized gas into the chamber where it dissolves in the liquid to form ozonized liquid, the apparatus further comprising:

means for injecting hydrogen peroxide into the ozonized liquid for completing an oxidation reaction therein through a radical route; and means for discharging liquid treated with ozone and hydrogen peroxide as the treated liquid proceeds through the chamber in an opposite direction.

2. The structure set forth in claim 1 wherein the hydrogen peroxide is injected at points along the first flow and opposite flow directions.

3. The structure set forth in claim 1 wherein the hydrogen peroxide is injected at points along the opposite flow direction by at least one hollow toroidal member transversely located in a base portion of the chamber and coaxial with the submerged inlet pipes, the member having spaced outlet orifices for producing maximum hydrogen peroxide injection.

* * * * *